(12) United States Patent
Lyu

(10) Patent No.: US 12,228,788 B2
(45) Date of Patent: Feb. 18, 2025

(54) IMAGING DEVICE AND ELECTRONIC DEVICE

(71) Applicant: GUANGDONG OPPO MOBILE TELECOMMUNICATIONS CORP., LTD., Dongguan (CN)

(72) Inventor: Xiangnan Lyu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 528 days.

(21) Appl. No.: 17/588,464

(22) Filed: Jan. 31, 2022

(65) Prior Publication Data

US 2022/0155553 A1    May 19, 2022

Related U.S. Application Data

(63) Continuation of application No. PCT/CN2020/105246, filed on Jul. 28, 2020.

(30) Foreign Application Priority Data

Aug. 2, 2019    (CN) .......................... 201910712259.1
Aug. 2, 2019    (CN) .......................... 201921251280.8

(51) Int. Cl.
    *G02B 7/04*     (2021.01)
    *G02B 7/02*     (2021.01)
    *G02B 13/00*    (2006.01)

(52) U.S. Cl.
    CPC ............... *G02B 7/04* (2013.01); *G02B 7/021* (2013.01); *G02B 13/0065* (2013.01)

(58) Field of Classification Search
    CPC ....... G02B 7/04; G02B 7/021; G02B 13/0065; G02B 7/1805; H04N 23/55
    See application file for complete search history.

(56) References Cited

U.S. PATENT DOCUMENTS

2008/0192366 A1*  8/2008  Chang .................... G02B 7/025
                                                        359/817
2009/0015708 A1*  1/2009  Ye .......................... H04N 23/51
                                                        348/373

(Continued)

FOREIGN PATENT DOCUMENTS

CN    101241217 A    8/2008
CN    103091942 A    5/2013

(Continued)

OTHER PUBLICATIONS

Communication pursuant to Article 94(3) EPC dated Jan. 2, 2024 from European Patent Application No. 20849596.0.

(Continued)

*Primary Examiner* — Sharrief I Broome
*Assistant Examiner* — K Muhammad
(74) *Attorney, Agent, or Firm* — Quarles & Brady LLP

(57) ABSTRACT

An imaging device (100) and an electronic device (1000). The imaging device (100) includes a housing (10) and a first lens module (20). The housing (10) includes a base plate (11) and a side plate (12). The side plate (12) is provided with a sliding groove (125). The first lens module (20) includes a casing (21) and a lens group (22). The casing (21) includes a main body (211) and a sliding block (212). The sliding block (212) is slidably disposed in the sliding groove (125). The casing (21) is configured to drive the lens group (22) to slide.

18 Claims, 11 Drawing Sheets

(56) References Cited

U.S. PATENT DOCUMENTS

| | | | |
|---|---|---|---|
| 2010/0157450 A1 | 6/2010 | Im et al. | |
| 2011/0007202 A1* | 1/2011 | Chiang | G02B 7/102 |
| | | | 348/E5.042 |
| 2013/0169299 A1* | 7/2013 | Wu | G01R 1/0408 |
| | | | 324/724 |
| 2014/0002912 A1* | 1/2014 | Ishikawa | G02B 7/102 |
| | | | 359/813 |
| 2019/0075227 A1* | 3/2019 | Wei | H04N 23/54 |

FOREIGN PATENT DOCUMENTS

| | | |
|---|---|---|
| CN | 203481032 U | 3/2014 |
| CN | 105158871 A | 12/2015 |
| CN | 206057663 U | 3/2017 |
| CN | 107479165 A | 12/2017 |
| CN | 206850909 U | 1/2018 |
| CN | 107783241 A | 3/2018 |
| CN | 209419711 U | 9/2019 |
| CN | 110737077 A | 1/2020 |
| CN | 110798600 A | 2/2020 |
| CN | 210129909 U | 3/2020 |
| CN | 111045183 A | 4/2020 |
| JP | 2007298617 A | 11/2007 |

OTHER PUBLICATIONS

International Search Report and the Written Opinion Dated Oct. 12, 2020 From the International Searching Authority Re. Application No. PCT/CN2020/105246.
Notice of Allowance Date Jan. 23, 2020 from China Application No. 201921251280.8.
The supplementary European search report dated Sep. 6, 2022 from European patent Application No. 20849596.0.
The First Office Action dated May 31, 2024 from Chinese Application No. 201910712259.1.

* cited by examiner

IMAGING DEVICE AND ELECTRONIC DEVICE

CROSS-REFERENCE TO RELATED APPLICATION

This application is a continuation of International Application No. PCT/CN2020/105246 filed on Jul. 28, 2020, which claims priority of Chinese Patent Applications No. 201910712259.1 and No. 201921251280.8 filed on Aug. 2, 2019. The entire disclosures of the above applications are incorporated herein by reference.

FIELD OF THE INVENTION

The present disclosure relates to the field of consumer electronics technology, and in particular to an imaging device and an electronic device.

BACKGROUND

Currently, in order to realize telephotography and wide-angle photography, an electronic device such as a mobile phone is generally provided with a separate telephoto lens and a separate wide-angle lens, so that the telephotography and the wide-angle photography are realized by switching the lenses.

SUMMARY

The present disclosure provides an imaging device and an electronic device.

The imaging device of the present disclosure comprises a housing and a first lens module. The housing comprises a base plate and a side plate disposed on the base plate. The side plate is provided with a sliding groove. The first lens module comprises a casing and a lens group disposed in the casing. The casing comprises a main body and a sliding block coupled to the main body. An extending direction of the sliding groove is parallel to an optical axis of the lens group. The sliding block is slidably disposed in the sliding groove. The casing is configured to drive the lens group to slide.

The electronic device of the present disclosure comprises a chassis and an imaging device disposed on the chassis. The imaging device of the present disclosure comprises a housing and a first lens module. The housing comprises a base plate and a side plate disposed on the base plate. The side plate is provided with a sliding groove. The first lens module comprises a casing and a lens group disposed in the casing. The casing comprises a main body and a sliding block coupled to the main body. An extending direction of the sliding groove is parallel to an optical axis of the lens group. The sliding block is slidably disposed in the sliding groove. The casing is configured to drive the lens group to slide.

BRIEF DESCRIPTION OF DRAWINGS

The above and/or additional aspects and advantages of the present disclosure will become obvious and be understood easily from a description of embodiments in conjunction with accompanying drawings.

DETAILED DESCRIPTION OF EMBODIMENTS

Figure 1:
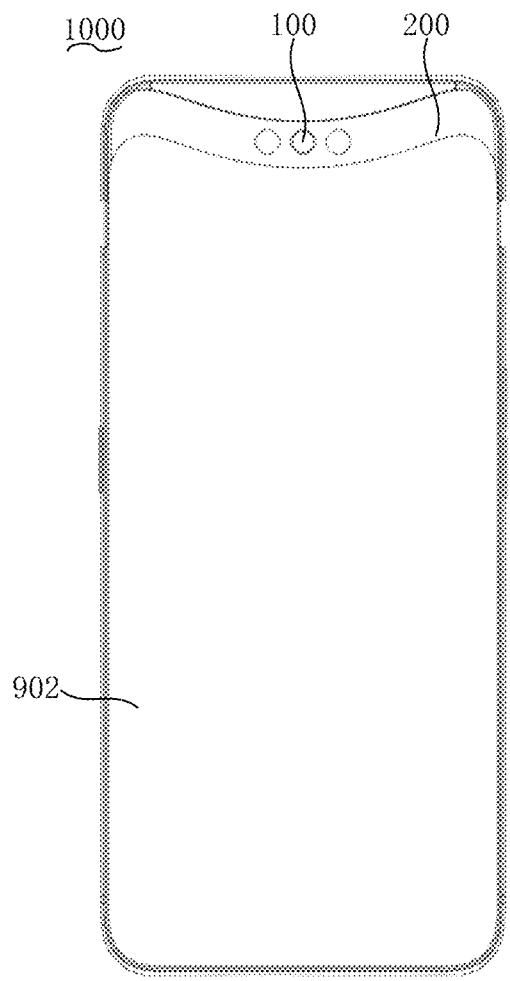
FIG. 1 is a schematic plan view of an electronic device according to some embodiments of the present disclosure.

Embodiments of the present disclosure will be further described below in conjunction with accompanying drawings. Same or similar reference numerals in the accompanying drawings indicate same or similar elements or elements with same or similar functions throughout.

Furthermore, the embodiments of the present disclosure described below in conjunction with the accompanying drawings are exemplary, and are only used to explain the embodiments of the present disclosure, and should not be construed as limiting the present disclosure.

In the present disclosure, unless otherwise specifically specified or limited, a description that a first feature is "on" or "under" a second feature may indicate that the first feature directly contacts the second feature, or that the first feature and the second feature are indirectly contacted through an intermediary. Furthermore, a description that the first feature is "on", "above", or "on top of" the second feature may indicate that the first feature is right or obliquely "on", "above", or "on top of" the second feature, or just means that a sea-level elevation of the first feature is greater than a sea-level elevation of the second feature. A description that the first feature "under", "below", or "on bottom of" the second feature may indicate that the first feature is right or obliquely "under", "below", or "on bottom of" the second feature, or just means that the sea-level elevation of the first feature is less than the sea-level elevation of the second feature.

Please refer to FIG. 3 to FIG. 6. In some embodiments, an imaging device 100 comprises a housing 10 and a first lens module 20. The housing 10 comprises a base plate 11 and a side plate 12 disposed on the base plate 11. The side plate 12 is provided with a sliding groove 125. The first lens module 20 comprises a casing 21 and a lens group 22 disposed in the casing 21. The casing 21 comprises a main body 211 and a sliding block 212 connected to the main body 211. An extending direction of the sliding groove 125 is parallel to an optical axis O of the lens group 22. The sliding block 212 is slidably disposed in the sliding groove 125. The casing 21 is configured to drive the lens group 22 to slide.

Figure 4:
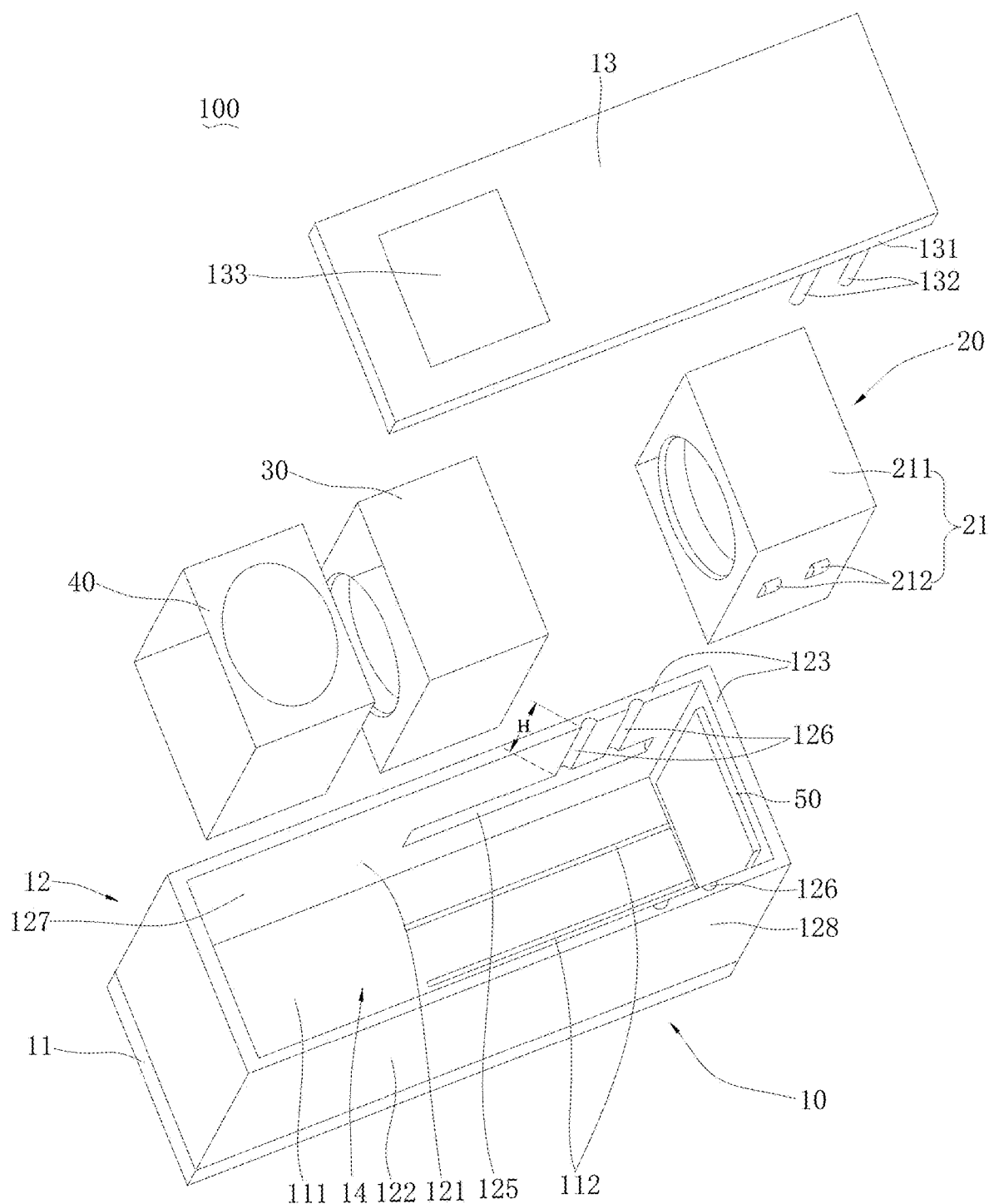
FIG. 4 is a schematic three-dimensional exploded diagram of the imaging device according to some embodiments of the present disclosure.
Figure 5:
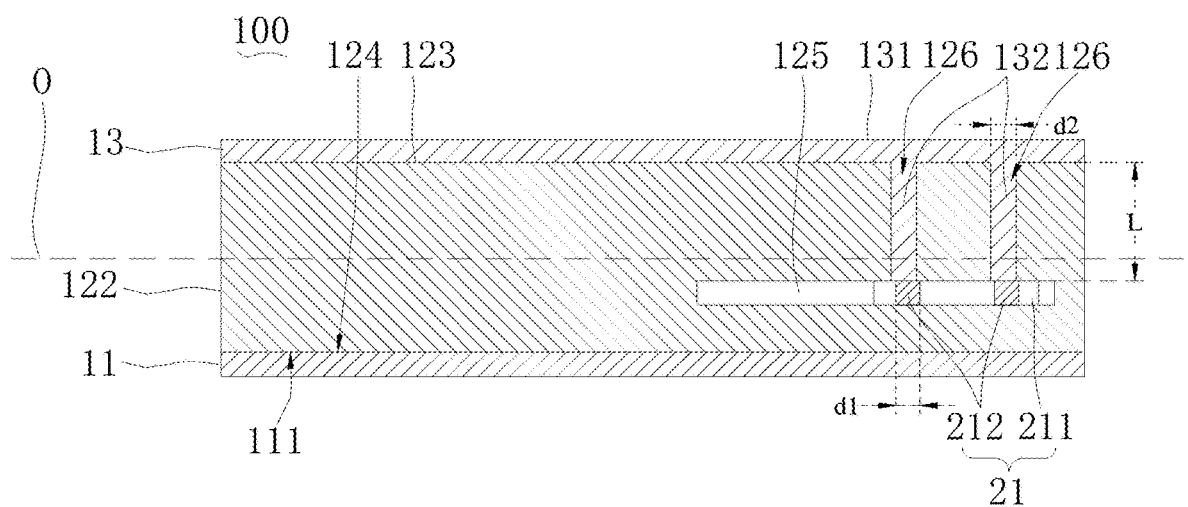
FIG. 5 is a schematic cross-sectional view of the imaging device of FIG. 3 along a line V-V.

Please refer to FIG. 4 and FIG. 5. In some embodiments, in a direction perpendicular to a bearing surface 111 of the base plate 11, opposite sides of the sliding block 212 respectively abut against opposite sides of an inner wall of the sliding groove 125.

Please refer to FIG. 4 and FIG. 5. In some embodiments, the side plate 12 is further provided with an installation groove 126. One end of the installation groove 126 penetrates a surface of the side plate 12 away from the base plate 11, and the other end of the installation groove 126 communicates with the sliding groove 125. The sliding block 212 is disposed in the sliding groove 125 through the installation groove 126.

Please refer to FIG. 3 to FIG. 6. In some embodiments, an extending direction of the installation groove 126 is perpendicular or inclined to the extending direction of the sliding groove 125.

Please refer to FIG. 4 and FIG. 5. In some embodiments, the housing 10 further comprises a cover plate 13 disposed on the side plate 12 and comprising a cover plate body 131 and a resisting portion 132. The resisting portion 132 is disposed on a side of the cover plate body 131 and in the installation groove 126. A length L of the resisting portion 132 in a direction perpendicular to the bearing surface 111 of the base plate 11 is equal to a depth H of the installation groove 126 in the direction perpendicular to the bearing surface 111.

Please refer to FIG. 5. In some embodiments, when the resisting portion 132 is disposed in the installation groove 126, the resisting portion 132 completely fills the installation groove 126.

Figure 8:
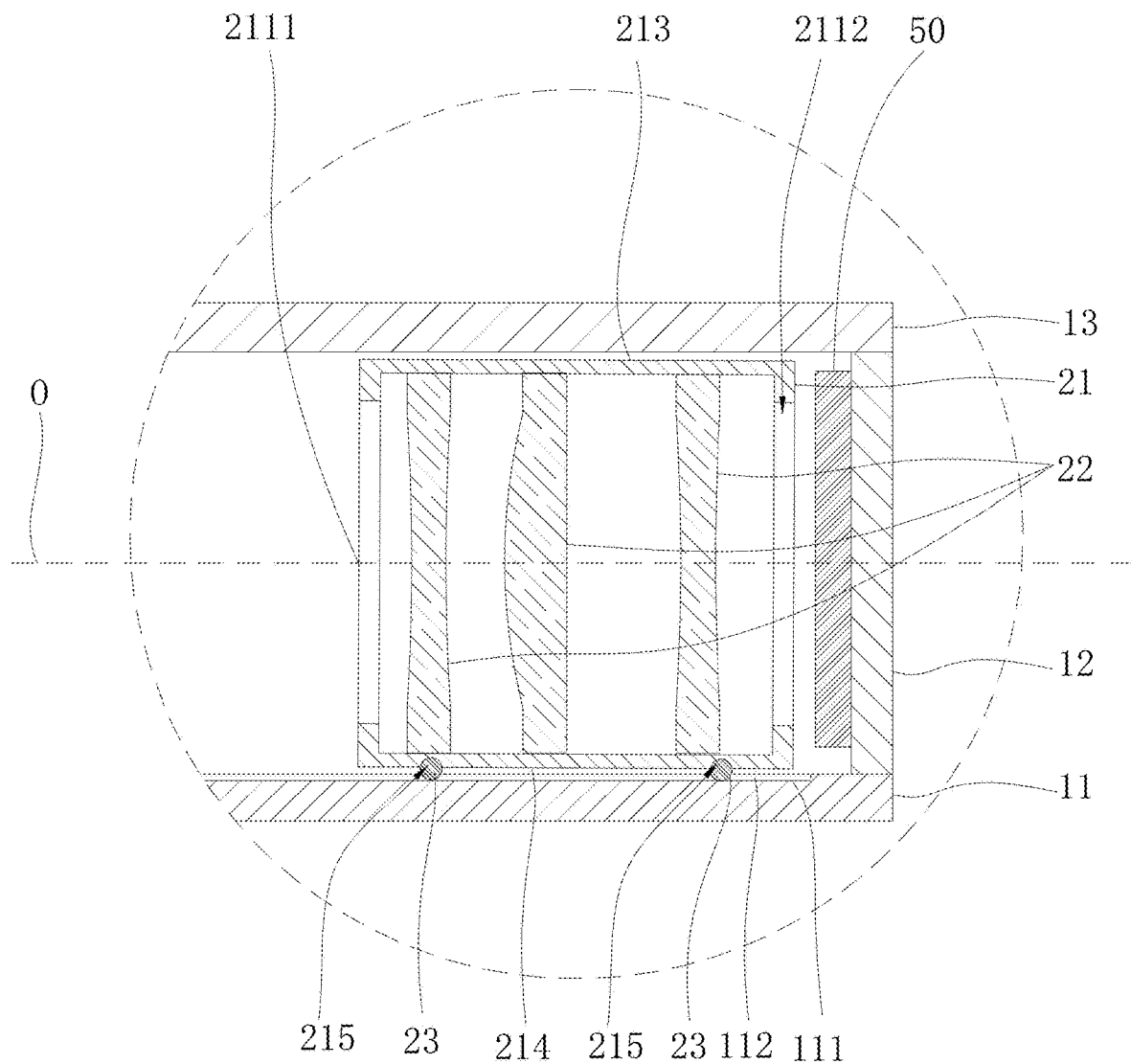
FIG. 8 is a schematic partial cross-sectional view of the imaging device of FIG. 3 along the line VI-VI according to some embodiments of the present disclosure.

Please refer to FIG. 4 and FIG. 8. In some embodiments, the casing 21 further comprises a top surface 213 and a bottom surface 214 opposite to each other. The top surface 213 faces the cover plate 13. The bottom surface 214 faces the base plate 11 and is provided with a first groove 215. A surface of the base plate 11 facing the bottom surface 214 is provided with a first slide rail 112. The first lens module 20 further comprises a first rolling ball 23 disposed in the first groove 215 and abuts against a bottom of the first slide rail 112.

Figure 9:
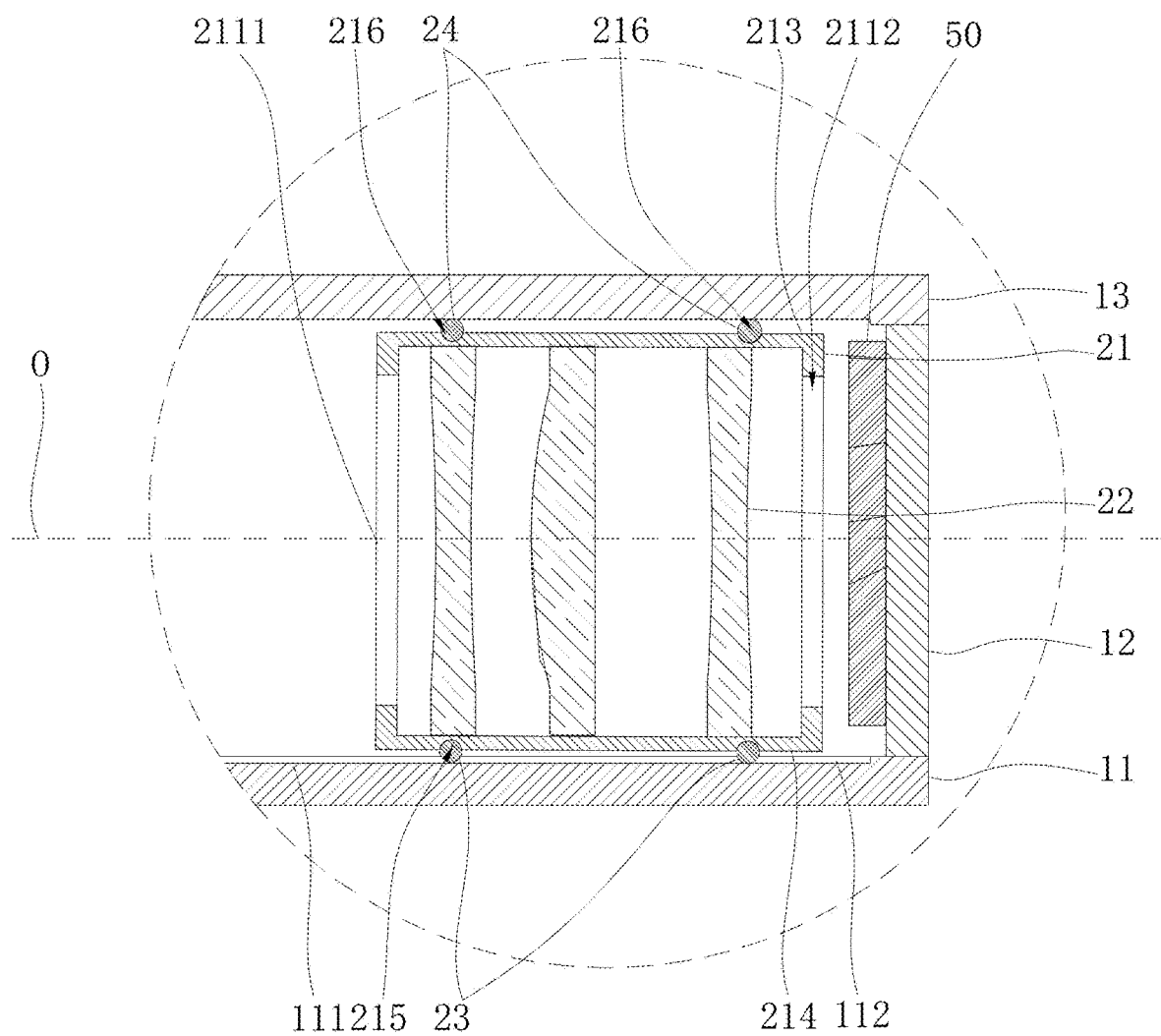
FIG. 9 is another schematic partial cross-sectional view of the imaging device of FIG. 3 along the line VI-VI according to some embodiments of the present disclosure.

Please refer to FIG. 4 and FIG. 9. In some embodiments, the top surface 213 is provided with a second groove 216. The first lens module 20 further comprises a second rolling ball 24 disposed in the second groove 216 and abuts against the cover plate 13.

Figure 10:
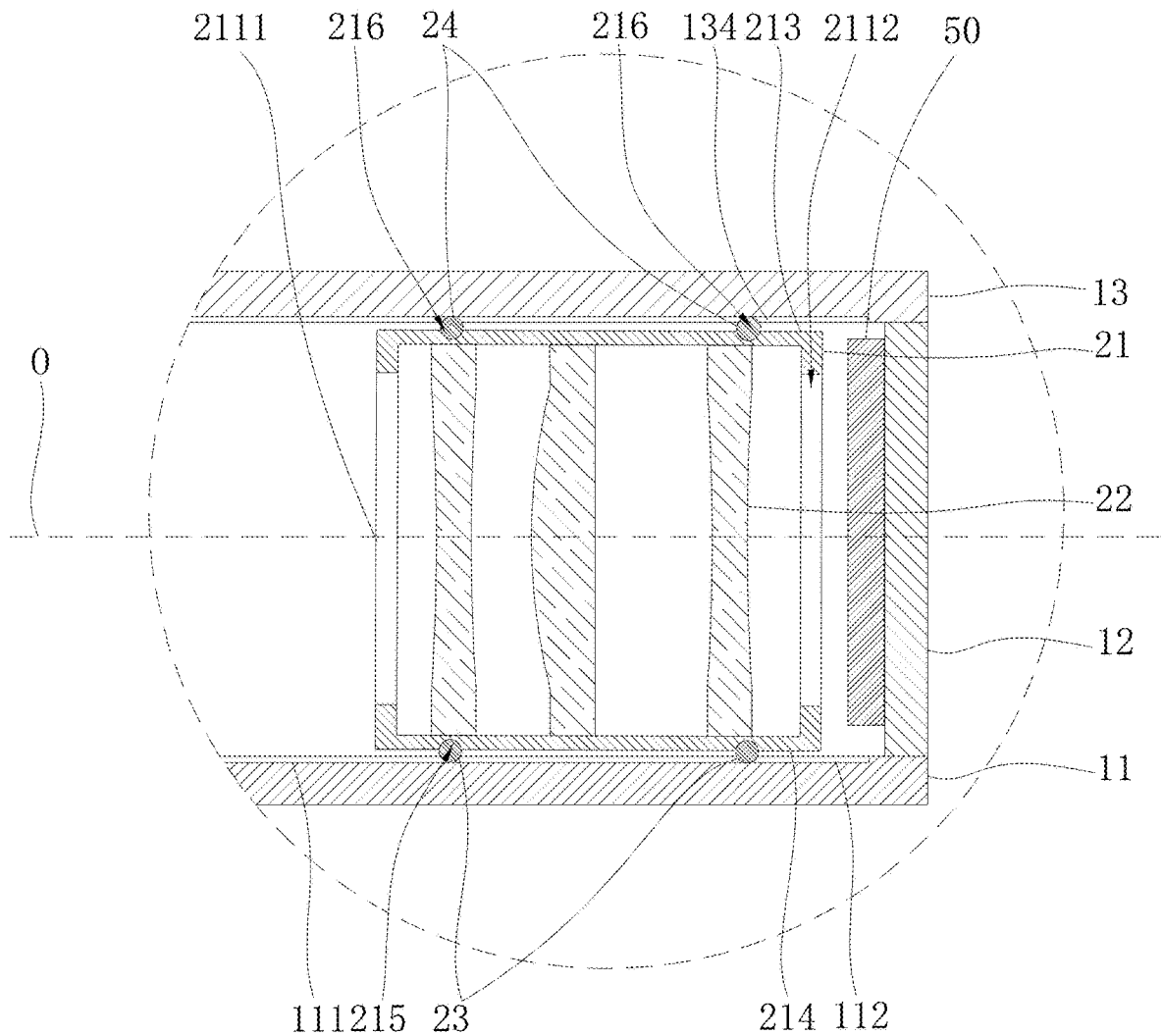
FIG. 10 is yet another schematic partial cross-sectional view of the imaging device of FIG. 3 along the line VI-VI according to some embodiments of the present disclosure.

Please refer to FIG. 4 and FIG. 10. In some embodiments, a surface of the cover plate 13 facing the top surface 213 is provided with a second slide rail 134. The second rolling ball 24 is disposed in the second groove 216 and abuts against a bottom of the second slide rail 134.

Figure 11:
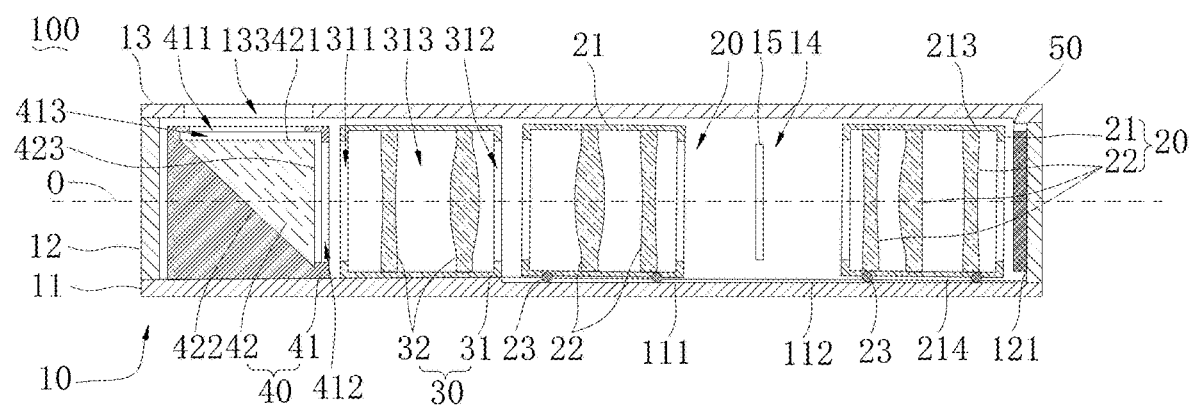
FIG. 11 is another schematic cross-sectional view of the imaging device of FIG. 3 along the line VI-VI according to some embodiments of the present disclosure.

Please refer to FIG. 11. In some embodiments, a number of the first lens module 20 may be multiple. The sliding block 212 of each first lens module 20 is slidably disposed in the sliding groove 125. The housing 10 further comprises one or more spacer plates 15 connected to the side plate 12. Two adjacent first lens modules 20 are separated by one spacer plate 15.

Figure 3:
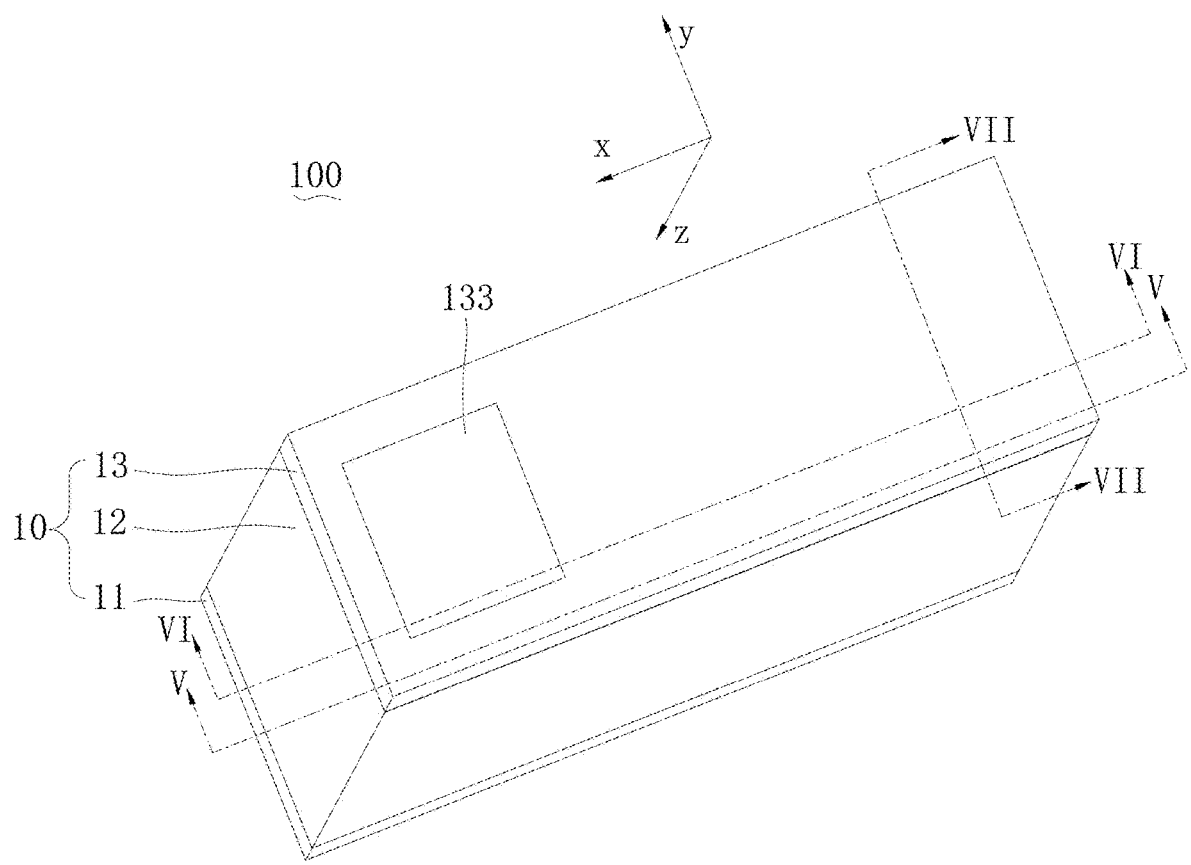
FIG. 3 is a schematic three-dimensional assembly view of an imaging device according to some embodiments of the present disclosure.
Figure 6:
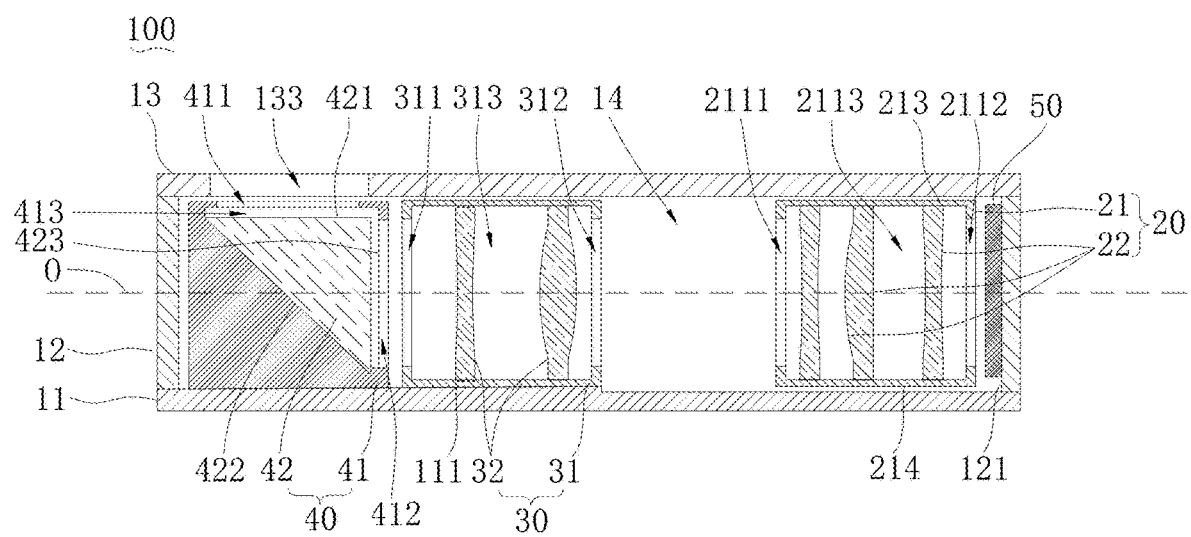
FIG. 6 is a schematic cross-sectional view of the imaging device of FIG. 3 along a line VI-VI.

Please refer to FIG. 1, FIG. 3, and FIG. 6. An electronic device 1000 of the present disclosure comprises a chassis 200 and an imaging device 100 combined with the chassis 200. The imaging device 100 comprises a housing 10 and a first lens module 20. The housing 10 comprises a base plate 11 and a side plate 12 disposed on the base plate 11. The side plate 12 is provided with a sliding groove 125. The first lens module 20 comprises a casing 21 and a lens group 22 disposed in the casing 21. The casing 21 comprises a main body 211 and a sliding block 212 connected to the main body 211. An extending direction of the sliding groove 125 is parallel to an optical axis O of the lens group 22. The sliding block 212 is slidably disposed in the sliding groove 125. The casing 21 is configured to drive the lens group 22 to slide.

Figure 2:
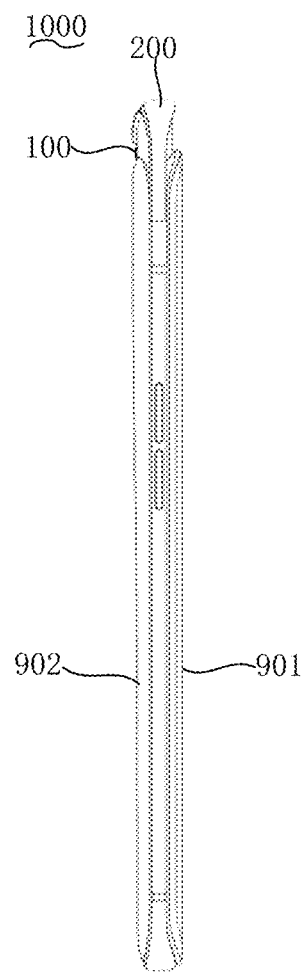
FIG. 2 is a schematic plan view from another perspective of the electronic device according to some embodiments of the present disclosure.

Please refer to FIG. 1 and FIG. 2. The electronic device 1000 comprises the chassis 200 and the imaging device 100 combined with the chassis 200. Specifically, the electronic device 1000 may be a mobile phone, a tablet computer, a monitor, a notebook computer, a teller machine, a gate machine, a smart watch, a head-mounted display device, a game console, or the like. The embodiments of the present disclosure are described by taking the electronic device 1000 as a mobile phone as an example. It can be understood that a specific form of the electronic device 1000 is not limited to a mobile phone.

The chassis 200 may be configured to install the imaging device 100. In other words, the chassis 200 may be configured as an installation carrier for the imaging device 100. The electronic device 1000 further comprises a front surface 901 and a back surface 902. The imaging device 100 may be disposed on the front surface 901 as a front camera. The imaging device 100 may also be disposed on the back surface 902 as a rear camera. In the embodiments of the present disclosure, the imaging device 100 is disposed on the back surface 902 as a rear camera. In addition to installing the imaging device 100, the chassis 200 may also be configured to install functional modules such as a power supply device and a communication device of the electronic device 1000. The chassis 200 provides protections such as dustproof, anti-drop, and waterproof for the functional modules such as the imaging device 100, the power supply device, and the communication device.

Please refer to FIG. 3 to FIG. 6, the imaging device 100 comprises the housing 10 and the first lens module 20. The first lens module 20 is received and installed in the housing 10.

The housing 10 comprises the base plate 11 and the side plate 12 disposed on the base plate 11. The side plate 12 is provided with the sliding groove 125. The first lens module 20 comprises the casing 21 and the lens group 22 disposed in the casing 21. The casing 21 comprises the main body 211 and the sliding block 212 connected to the main body 211. The extending direction of the sliding groove 125 is parallel to the optical axis O of the lens group 22. The sliding block 212 is slidably disposed in the sliding groove 125. The casing 21 is configured to drive the lens group 22 to slide.

A shape of the sliding block 212 matches a shape of the sliding groove 125. For example, the sliding groove 125 is a rectangular groove, and the sliding block 212 is a rectangular block. That is, cross-sections of the sliding groove 125 and the sliding block 212 cut by a plane (i.e. a plane parallel to a line VII-VII in FIG. 3, an explanation for this below is same) perpendicular to the optical axis O are both rectangular. Alternatively, the sliding groove 125 is a semicircular groove, and the sliding block 212 is a semicircular block. That is, the cross-sections of the sliding groove 125 and the sliding block 212 cut by the plane perpendicular to the optical axis O are both semicircular. Alternatively, the sliding groove 125 is a rectangular groove, and the sliding block 212 is a semicircular block. That is, the cross-section of the sliding groove 125 cut by the plane perpendicular to the optical axis O is rectangular, and the cross-section of the sliding block 212 cut by the plane perpendicular to the optical axis O is semicircular. The cross-sections of the sliding groove 125 and the sliding block 212 cut by the plane perpendicular to the optical axis O may also be other shapes, such as other regular shapes or irregular shapes, as long as the sliding block 212 can match the sliding groove 125 to slide in the sliding groove 125, which will not be described in detail herein. In this embodiment, the cross-sections of the sliding groove 125 and the sliding block 212 cut by the plane perpendicular to the optical axis O both are irregular shapes. Each of the irregular shape is a closed "D" shape composed of a straight line and an arc. A curvature of an arc corresponding to the inner wall of the sliding groove 125 is same as a curvature of an arc corresponding to an outer wall of the sliding block 212, so that the sliding block 212 and the sliding groove 125 can be better matched.

Recently, it is generally necessary to dispose both a telephoto lens and a wide-angle lens at a same time, so that telephotography and wide-angle photography can be realized by switching the lenses. A single lens cannot realize the telephotography and the wide-angle photography.

In the imaging device 100 of the present disclosure, the sliding block 212 of the casing 21 cooperates with the sliding groove 125 of the side plate 12 of the housing 10 to move the first lens group 22, so that a focal length of the imaging device 100 is variable. Therefore, the telephotography and the wide-angle photography can be realized without disposing a telephoto lens and a wide-angle lens at a same time.

Please refer to FIG. 3 and FIG. 4. In this embodiment, the imaging device 100 comprises the housing 10 and the first lens module 20.

The housing 10 comprises the base plate 11, the side plate 12, and the cover plate 13. The base plate 11, the side plate 12, and the cover plate 13 define a receiving space 14. The first lens module 20 is disposed in the receiving space 14.

The base plate 11 comprises the bearing surface 111. The bearing surface 111 is configured to bear the side plate 12 and the first lens module 20. The base plate 11 may be a rectangular parallelepiped structure, a cube structure, a cylindrical structure, or a structure of other shapes, which is not limited herein. In this embodiment, the base plate 11 is a rectangular parallelepiped structure.

The side plate 12 is disposed around an edge of the base plate 11. The side plate 12 is perpendicular to the base plate 11. The side plate 12 may be disposed on the base plate 11 by gluing, screwing, snapping, or the like. The side plate 12 may also be integrally formed with the base plate 11.

Please refer to FIG. 5, the side plate 12 comprises an inner surface 121, an outer surface 122, an upper surface 123, and a lower surface 124. The inner surface 121 and the outer surface 122 are opposite to each other. The inner surface 121 is located in the receiving space 14. The outer surface 122 is located outside the receiving space 14. The inner surface 121 is connected to both the upper surface 123 and the lower surface 124. The outer surface 122 is also connected to both the upper surface 123 and the lower surface 124. The upper surface 123 and the lower surface 124 are opposite to each other. The lower surface 124 is connected to the bearing surface 111 of the base plate 11. The upper surface 123 is away from the bearing surface 111 of the base plate 11.

The side plate 12 further comprises a first side plate 127 and a second side plate 128 parallel to the optical axis O. The first side plate 127 and the second side plate 128 are opposite to each other. An inner surface 121 of the first side plate 127 and/or an inner surface 121 of the second side plate 128 are provided with the sliding groove 125 and the installation groove 126. For example, the inner surface 121 of the first side plate 127 is provided with the sliding groove 125 and the installation groove 126. Alternatively, the inner surface 121 of the second side plate 128 is provided with the sliding groove 125 and the installation groove 126. Alternatively, both the inner side 121 of the first side plate 127 and the inner side 121 of the second side plate 128 are provided with the sliding groove 125 and the installation groove 126. In this embodiment, both the inner side 121 of the first side plate 127 and the inner side 121 of the second side plate 128 are provided with the sliding groove 125 and the installation groove 126. The extending direction of the sliding groove 125 is parallel to the bearing surface 111.

The sliding groove 125 communicates with the receiving space 14. The extending direction of the sliding groove 125 is parallel to the optical axis O. A groove depth of the sliding groove 125 is less than a thickness of the side plate 12. In other words, the sliding groove 125 does not penetrate the outer surface 122 of the side plate 12. In other embodiments, the sliding groove 125 penetrates the outer surface 122 of the side plate 12, so that the receiving space 14 communicates with outside. A number of the sliding grooves 125 formed on the inner surface 121 of the first side plate 127 and the inner surface 121 of the second side plate 128 may be one or more. For example, the inner surface 121 of the first side plate 127 is provided with one sliding groove 125, and the inner surface 121 of the second side plate 128 is provided with one sliding groove 125. For another example, the inner surface 121 of the first side plate 127 is provided with two sliding grooves 125, and the inner surface 121 of the second side plate 128 is provided with two sliding grooves 125. For yet another example, the inner surface 121 of the first side plate 127 is provided with one sliding groove 125, and the inner surface 121 of the second side plate 128 is provided with two sliding grooves 125, and so on, which will not be listed herein. In this embodiment, both the inner surface 121 of the first side plate 127 and the inner surface 121 of the second side plate 128 are provided with one sliding groove 125. The cross-section of the sliding groove 125 cut by the plane perpendicular to the optical axis O is rectangular, semicircular, or other shapes, such as other regular shapes or irregular shapes. Please refer to FIG. 7. In this embodiment, the cross-section of the sliding groove 125 cut by the plane perpendicular to the optical axis O is an irregular shape. The irregular shape is a closed "D" shape composed of a straight line and an arc. A cross-sectional shape of the inner wall of the sliding groove 125 corresponds to the arc of the "D" shape.

The installation groove 126 communicates with the receiving space 14. One end of the installation groove 126 penetrates the upper surface 123 of the side plate 12. The other end of the installation groove 126 communicates with the sliding groove 125. The extending direction of the installation groove 126 may be perpendicular or inclined to the extending direction of the sliding groove 125. For example, the extending direction of the installation groove 126 is perpendicular to the optical axis O. Alternatively, the extending direction of the installation groove 126 is inclined at a certain angle (not 0°, but 30°, 60°, 120°, etc.) with respect to the optical axis O. In this embodiment, the extending direction of the installation groove 126 is perpendicular to the optical axis O. A number of the installation grooves 126 formed on the inner surface 121 of the first side plate 127 and the inner surface 121 of the second side plate 128 may be one or more. For example, the inner surface 121 of the first side plate 127 is provided with one installation groove 126, and the inner surface 121 of the second side plate 128 is provided with one installation groove 126. For another example, the inner surface 121 of the first side plate 127 is provided with two installation grooves 126, and the inner surface 121 of the second side plate 128 is provided with two installation grooves 126. For yet another example, the inner surface 121 of the first side plate 127 is provided with one installation groove 126, and the inner surface 121 of the second side plate 128 is provided with two installation grooves 126, and so on, which will not be listed herein. In this embodiment, the inner surface 121 of the first side plate 127 and the inner surface 121 of the second side plate 128 are both provided with two installation grooves 126.

The cover plate 13 is disposed on the side plate 12. Specifically, the cover plate 13 may be disposed on the upper surface 123 of the side plate 12 by clamping, screwing, gluing, or the like. The cover plate 13 comprises the cover plate body 131 and a plurality of the resisting portions 132. The cover plate body 131 is connected to the upper surface 123 of the side plate 12. The cover plate body 131 is provided with a light entrance 133. A depth direction of the light entrance 133 may be perpendicular to the optical axis O, so that the imaging device 100 has a periscope structure as a whole. The resisting portions 132 are disposed on two opposite sides of the cover plate body 131. Specifically, the resisting portions 132 are disposed on two sides of the cover plate 13 respectively corresponding to the first side plate 127 and the second side plate 128. When the cover plate 13 is disposed on the side plate 12, the resisting portions 132 are disposed in the installation grooves 126. As shown in FIG. 3, a direction parallel to the optical axis O is defined as an x direction, a direction perpendicular to the inner surface 121 of the first side plate 127 is defined as a y direction, and a direction perpendicular to the bearing surface 111 is defined as a z direction. The x direction, the y direction, and the z direction are perpendicular to each other. The length L of the resisting portions 132 in the direction perpendicular to the bearing surface 111 of the base plate 11 is equal to the depth H of the installation grooves 126 in the z direction. The resisting portions 132 are disposed in the installation grooves 126, which may be that each of the resisting portions 132 is disposed in one installation groove 126 and occupies a part of a space of the installation groove 126. The resisting portions 132 are disposed in the installation grooves 126, which may be that each of the resisting portions 132 is disposed in one installation groove 126 and completely fills the installation groove 126. In this embodiment, when the resisting portions 132 are disposed in the installation grooves 126, the resisting portions 132 completely fill the installation grooves 126 so that the resisting portions 132 and the installation grooves 126 are combined more firmly, and thus the cover plate 13 and the side plate 12 are connected more firmly. In other embodiments, the light entrance 133 is not a via hole, but a light-transmitting physical structure. Light can enter the receiving space 14 from the light-transmitting physical structure.

Please refer to FIG. 4 to FIG. 6, the first lens module 20 comprises the casing 21 and the lens group 22. The lens group 22 is disposed in the casing 21. When the casing 21 slides, the casing 21 drives the lens group 22 to slide. A number of the first lens module 20 is one or more. For example, the number of the first lens module 20 is one, two, three, or the like. In this embodiment, the number of the first lens module 20 is one.

The casing 21 comprises the main body 211 and the sliding block 212. The main body 211 is fixedly connected to the sliding block 212.

The main body 211 comprises a light-inlet 2111 and a light-outlet 2112 corresponding to the lens group 22. The main body 211 is provided with an accommodating space 2113 for accommodating the lens group 22. The accommodating space 2113 communicates with the receiving space 14 through the light-inlet 2111 and the light-outlet 2112.

Please refer to FIG. 4 and FIG. 5, the sliding block 212 is movably disposed in the sliding groove 125. A number of the sliding block 212 matches a number of the installation groove 126. The number of the sliding block 212 matches the number of the installation groove 126, which means that a number of the sliding block 212 located on a surface of the main body 211 facing the inner surface 121 of the first side plate 127 is same as a number of the installation groove 126 formed on the inner surface 121 of the first side plate 127, both are two. And, a number of the sliding block 212 located on a surface of the main body 211 facing the inner surface 121 of the second side plate 128 is same as a number of the installation groove 126 formed on the inner surface 121 of the second side plate 128, both are two, and the two sliding blocks 212 correspond to the two installation grooves 126 one-to-one. In other embodiments, the number of sliding block 212 may be less than the number of installation grooves 126. For example, the number of the sliding block 212 located on the surface of the main body 211 facing the inner surface 121 of the first side plate 127 is less than the number of the installation groove 126 formed on the inner surface 121 of the first side plate 127, and the number of the sliding block 212 located on the surface of the main body 211 facing the inner surface 121 of the second side plate 128 is less than the number of the installation groove 126 formed on the inner surface 121 of the second side plate 128. Moreover, a length dl of the sliding blocks 212 in the x direction is less than or equal to a length d2 of the installation grooves 126 in the x direction, so as to facilitate the sliding blocks 212 to slide into the sliding grooves 125 through the installation grooves 126.

The cross-section of each of the installation grooves 126 cut by the plane perpendicular to the optical axis O is rectangular, semicircular, or other shapes, such as other regular shapes or irregular shapes, as long as a shape of one sliding block 212 matches a shape of one corresponding sliding groove 125. Specifically, the shape of one sliding block 212 matches the shape of one corresponding sliding groove 125, which means that when a cross-section of the sliding groove 125 formed on the inner side surface 121 of the first side plate 127 cut by the plane perpendicular to the optical axis O is rectangular, a cross-section of the sliding block 212 located on the surface of the main body 211 facing the inner surface 121 of the first side plate 127 is also rectangular. when a cross-section of the sliding groove 125 formed on the inner side surface 121 of the second side plate 128 cut by the plane perpendicular to the optical axis O is rectangular, a cross-section of the sliding block 212 located on the surface of the main body 211 facing the inner surface 121 of the second side plate 128 is also rectangular. when a cross-section of the sliding groove 125 formed on the inner side surface 121 of the first side plate 127 cut by the plane perpendicular to the optical axis O is rectangular, a cross-section of the sliding block 212 located on the surface of the main body 211 facing the inner surface 121 of the first side plate 127 is also semicircular. when a cross-section of the sliding groove 125 formed on the inner side surface 121 of the second side plate 128 cut by the plane perpendicular to the optical axis O is semicircular, a cross-section of the sliding block 212 located on the surface of the main body 211 facing the inner surface 121 of the second side plate 128 is also semicircular, and so on, which will not be listed herein.

Figure 7:
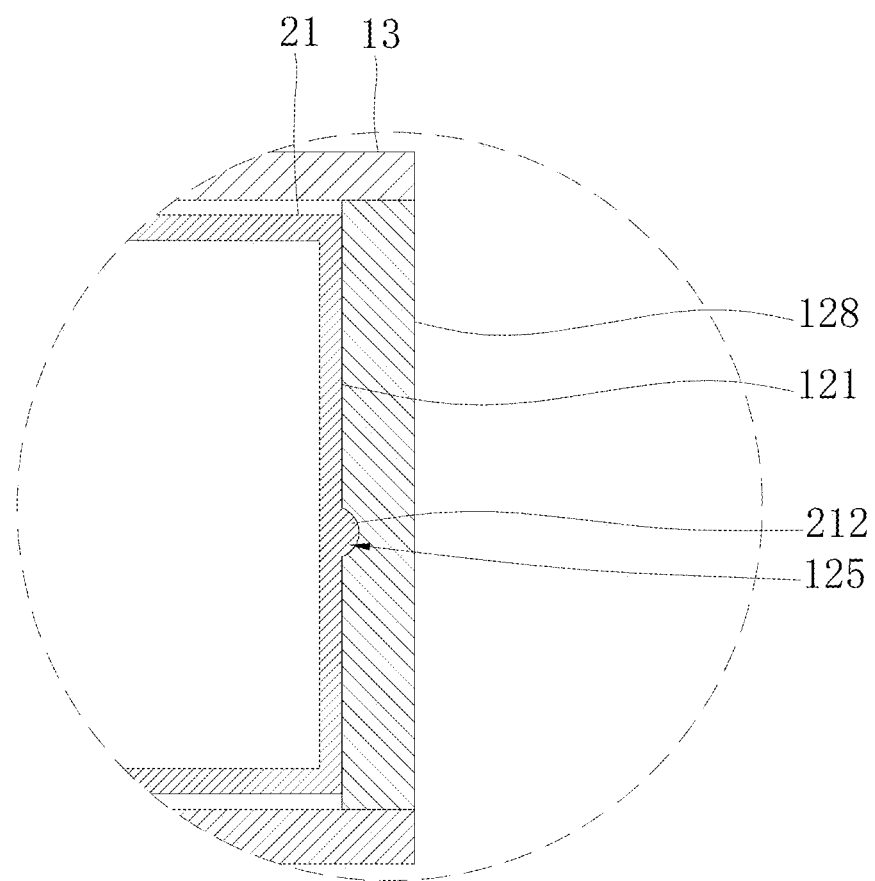
FIG. 7 is a schematic partial cross-sectional view of the imaging device of FIG. 3 along a line VII-VII.

Please refer to FIG. 7. In this embodiment, the cross-section of the sliding block 212 cut by the plane perpendicular to the optical axis O is an irregular shape. The irregular shape is a closed "D" shape composed of a straight line and an arc. A cross-sectional shape of the outer wall of the sliding block 212 corresponds to the arc of the "D" shape. The shape of one sliding block 212 matches the shape of one corresponding sliding groove 125, which means that the curvature of the arc corresponding to the inner wall of the sliding groove 125 is the same as the curvature of the arc corresponding to the outer wall of the sliding block 212. Therefore, the sliding block 212 and the sliding groove 125 can be better matched.

In z direction, the opposite sides of the sliding block 212 respectively abut against the opposite sides of an inner wall of the sliding groove 125. Specifically, when the sliding blocks 212 are disposed in the sliding grooves 125, in the z direction, opposite sides of the sliding block 212 corresponding to the first side plate 127 are abutted by opposite sides of the inner wall of the sliding groove 125 on the inner surface 121 of the first side plate 127. And, opposite sides of the sliding block 212 corresponding to the second side plate 128 are abutted by opposite sides of the inner wall of the sliding groove 125 on the inner surface 121 of the second side plate 128. As a result, movement of the sliding blocks 212 in the z direction is restricted, which prevents the sliding blocks 212 from shaking or tilting in the z direction, thereby ensuring that an imaging quality of the first lens module 20 is not affected.

The lens group 22 is disposed in the accommodating space 2113. Specifically, the lens group 22 may be disposed in the accommodating space 2113 by gluing, screwing, snapping, or the like. The lens group 22 may be a separate lens, and the lens is a convex lens or a concave lens. Alternatively, the lens group 22 comprises a plurality of (such as two, three, etc.) lenses. The lenses may all be convex lenses or concave lenses. Alternatively, some of the lenses may be convex lenses, while others may be concave lenses. In this embodiment, the lens group 22 comprises three lenses.

Please refer to FIG. 4 and FIG. 6, the imaging device 100 further comprises a second lens module 30, a prism assembly 40, and a photosensitive element 50.

The second lens module 30 comprises a fixed casing 31 and a lens group 32. The lens group 32 is disposed in the fixed casing 31.

The fixed casing 31 is disposed on the bearing surface 111 of the base plate 11. Specifically, the fixed casing 31 may be fixedly disposed on the bearing surface 111 by gluing, screwing, snapping, or the like. The fixed casing 31 may also be integrally formed with the base plate 11. The fixed casing 31 comprises a light-inlet hole 311, a light-outlet hole 312, and a receiving cavity 313. The receiving cavity 313 communicates with the receiving space 14 through the light-inlet hole 311 and the light-outlet hole 312. The light-outlet hole 312 faces the light-inlet 2111 of the first lens module 20. The light-inlet hole 311 faces the lens group 32.

The lens group 32 is disposed in the receiving cavity 313. The lens group 32 may be disposed in the fixed casing 31 by gluing, screwing, snapping, or the like. The lens group 32 may be a separate lens, and the lens is a convex lens or a concave lens. Alternatively, the lens group 32 comprises a plurality of (such as two, three, etc.) lenses. The lenses may all be convex lenses or concave lenses. Alternatively, some of the lenses may be convex lenses, while others may be concave lenses. In this embodiment, the lens group 32 comprises two lenses.

The prism assembly 40 is disposed on the bearing surface 111 of the base plate 11 and in the receiving space 14. The prism assembly 40 comprises a mounting platform 41 and a prism 42.

The mounting platform 41 is disposed on the bearing surface 111 of the base plate 11. Specifically, the mounting platform 41 may be disposed on the bearing surface 111 by gluing, screwing, snapping, etc. The mounting platform 41 may also be integrally formed with the base plate 11. The mounting platform 41 comprises a light-inlet via hole 411, a light-outlet via hole 412, and an accommodating cavity 413. The accommodating cavity 413 communicates with the receiving space 14 through the light-inlet via hole 411 and the light-outlet via hole 412. The light-inlet via hole 411 faces the light entrance 133 of the cover plate 13. The light-outlet via hole 412 faces the light-inlet hole 311 of the second lens module 30.

The prism 42 is disposed in the accommodating cavity 413. The prism 42 may be disposed on the mounting platform 41 by gluing, snapping, or the like. The prism 42 comprises an incident surface 421, a reflective surface 422, and an emission surface 423. The reflective surface 422 obliquely connects the incident surface 421 and the emission surface 423. An angle between the reflective surface 422 and the bearing surface 111 may be 15 degrees, 30 degrees, 45 degrees, 60 degrees, 75 degrees, or the like. In this embodiment, the angle between the reflective surface 422 and the bearing surface 111 is 45 degrees. The incident surface 421 faces the light-inlet via hole 411, and the emission surface 423 faces the light-outlet via hole 412. The prism 42 is configured to change an exit direction of a light entering the light-inlet via hole 411. The prism 42 may be a triangular prism. Specifically, a cross-section of the prism 42 is a right triangle. Two right-angled sides of the right triangle are the incident surface 421 and the emission surface 423, respectively. A hypotenuse of the right triangle is the reflective surface 422.

The photosensitive element 50 is disposed on the inner surface 121 of the side plate 12. The photosensitive element 50 faces the light-outlet 2112 of the first lens module 20. The photosensitive element 50 may be a complementary metal oxide semiconductor (CMOS) photosensitive element 50 or a charge-coupled device (CCD) photosensitive element 50.

Please refer to FIG. 4 to FIG. 6. In this embodiment, the prism assembly 40, the second lens module 30, and the first lens module 20 are sequentially disposed in the receiving space 14 along the optical axis O. The prism assembly 40 and the second lens module 30 are fixedly disposed on the bearing surface 111 of the base plate 11. The sliding blocks 212 pass through the installation grooves 126 and then slide into the sliding grooves 125, so that the sliding blocks 212 are slidably disposed in the sliding grooves 125, and the first lens module 20 is slidably connected to the side plate 12. The sliding blocks 212 are fixedly connected to the main body 211. When the sliding blocks 212 slide in the sliding grooves 125, a distance between the first lens module 20 and the second lens module 30 changes. After the prism assembly 40, the second lens module 30, and the first lens module 20 are disposed, the cover plate 13 is disposed on the side plate 12. The resisting portions 132 of the cover plate 13 completely fill the installation grooves 126. It can be understood that when the first lens module 20 is sliding and the sliding blocks 212 pass through positions of the sliding grooves 125 corresponding to the installation grooves 126, the sliding blocks 212 may shake or tilt in the direction perpendicular to the bearing surface 11 because there is no inner wall of the sliding grooves 125 against the slider 212. Accordingly, after the resisting portions 132 completely fill the installation grooves 126, the resisting portions 132 can abut against the sliding blocks 212, thereby preventing the sliding blocks 212 from shaking or tilting in the z direction.

It should be noted that the electronic device 1000 may further comprise a drive structure. For example, the drive structure may be a magnetic drive structure disposed in the receiving space 14. The magnetic drive structure comprises a magnetic coil and a magnet. The magnetic coil may be disposed between the second lens module 30 and the first lens module 20, between the prism assembly 40 and the second lens module 30, or between the first lens module 20 and the photosensitive element 50. The magnet may be disposed on the main body 211 of the first lens module 20. When the magnetic coil has electricity in different directions, corresponding magnetic fields will be generated, thereby controlling the first lens module 20 provided with the magnet to move away from or close to the magnetic coil, and causing the sliding blocks 212 to slide in the sliding grooves 125.

For another example, the drive structure may also be a linear motor. A stator of the linear motor may be fixedly disposed on the inner side 121. A mover of the linear motor extends from the stator and is connected to the main body 211. When the mover telescopically moves in a straight line, the main body 211 is driven to move linearly, so that sliding blocks 212 slide in the sliding grooves 125. A number of the linear motor may be two, one is disposed on the inner side 121 of the first side plate 127, and the other is disposed on the inner side 121 of the second side plate 128. The linear motor may be disposed on any side of the second lens module 30. For example, the linear motor may be disposed between the second lens module 30 and the first lens module 20, between the prism assembly 40 and the second lens module 30, or between the first lens module 20 and the photosensitive element 50. The drive structure may also be other structures, such as a hydraulic structure, a piezoelectric motor, etc., which will not be listed herein.

During imaging, light passes through the light entrance 133 of the cover plate 13 and the light-inlet via hole 411 of the prism assembly 40, is reflected by the reflective surface 422 of the prism 42, and then exits from the light-outlet via hole 412. Then, the light sequentially passes through the light-inlet hole 311, the lens group 32, and the light-outlet hole 312 of the second lens module 30, and the light-inlet 2111, the lens group 22, and the light-outlet 2112 of the first lens module 20, and finally reaches the photosensitive element 50 for the imaging A relative distance between the first lens module 20 and the second lens module 30 may be changed by relative movement of the sliding blocks 212 in the sliding grooves 125, thereby changing the focal length of the imaging device 100 and achieving zooming of the imaging device 100.

Please refer to FIG. 4 and FIG. 8. In some embodiments, the casing 21 further comprises the top surface 213 and the bottom surface 214 opposite to each other. The top surface 213 faces the cover plate 13. The bottom surface 214 faces the bearing surface 111 of the base plate 11. The bottom surface 214 is provided with the first groove 215. The surface (i.e. the bearing surface 111) of the base plate 11 facing the bottom surface 214 is provided with the first slide rail 112. The first lens module 20 further comprises the first rolling ball 23 disposed in the first groove 215 and abuts against the bottom of the first slide rail 112.

Specifically, a shape of the first groove 215 matches a shape of the first rolling ball 23. For example, the first rolling ball 23 is spherical and has a small moving resistance. The first groove 215 is a semicircular groove. A diameter of the first rolling ball 23 is equal to a diameter of the first groove 215. In other words, a half of the first rolling ball 23 is disposed in the first groove 215. The first rolling ball 23 is tightly combined with the first groove 215, so that when the first rolling ball 23 moves, the casing 21 of the first lens module 20 is driven to move. The bearing surface 111 is provided with the first slide rail 112. The first slide rail 112 may be a groove formed on the bearing surface 111 with an extending direction parallel to the optical axis O. The first sliding rail 112 may also be a boss disposed on the bearing surface 111 with an extending direction parallel to the optical axis O. A surface of the boss facing the bottom surface 214 of the casing 21 is provided with a groove matching the first rolling ball 23. In this embodiment, the first slide rail 112 is a groove formed on the bearing surface 111 with an extending direction parallel to the optical axis O. After the first lens module 20 is disposed in the receiving space 14, a part of the first rolling ball 23 is disposed in the first slide rail 112 and abuts against the bottom of the first slide rail 112. A cross-section of an inner wall of the first slide rail 112 cut by the plane perpendicular to the optical axis O is a first arc. A cross-section of an outer contour of the first rolling ball 23 cut by the plane perpendicular to the optical axis O is a second arc. A curvature of the first arc is same as a curvature of the second arc. When the first rolling ball 23 rotates along the first slide rail 112, in the y direction, opposite sides of an outer wall of the first rolling ball 23 are abutted by opposite sides of the inner wall of the first slide rail 112, thereby restricting movement of the first rolling ball 23 in the y direction, and preventing the first lens module 20 from shaking or tilting in the y direction.

A number of the first groove 215 is one or more. For example, the number of the first groove 215 is one, two, three, four, or more. In this embodiment, the number of the first groove 215 is four. A number of the first rolling ball 23 may also be one or more. In this embodiment, the number of the first rolling ball 23 is same as the number of the first groove 215, which is also four. The four first grooves 215 are formed on the bottom surface 214 of the casing 21 at intervals.

A number of the first slide rail 112 may be one or more. The number of the first slide rail 112 is determined according to positions of the four first grooves 215. For example, if centers of the four first grooves 215 are on a straight line parallel to the optical axis O, only one first slide rail 112 is needed. For another example, the four first grooves 215 are divided into two groups. Each group comprises two first grooves 215. A line connecting centers of the two first grooves 215 in each group is parallel to the optical axis O. The line connecting the centers of the two first grooves 215 in one group does not overlap with the line connecting the centers of the two first grooves 215 in the other group. Therefore, two first slide rails 112 are required, which respectively correspond to the two groups each comprising the two first grooves 215. In this embodiment, the four first grooves 215 are divided into the two groups, each group comprises the two first grooves 215, and the line connecting the centers of the two first grooves 215 in one group is parallel to the line connecting the centers of the two first grooves 215 in the other group, and is parallel to the optical axis O. The four first grooves 215 may be enclosed in a rectangle. Therefore, when the four first rolling balls 23 slide in the two first slide rails 112, the four first rolling balls 23 are restricted in the two first slide rails 112. And, in the y direction, the opposite sides of the outer wall of each of the first rolling balls 23 are abutted by the opposite sides of the inner wall of one corresponding first slide rail 112, thereby preventing the first lens module 20 from shaking or tilting in the y direction, and ensuring that an imaging quality of the imaging device 100 is not affected.

Please refer to FIG. 4 and FIG. 9. In some embodiments, the top surface 213 of the casing 21 is provided with the second groove 216. The first lens module 20 further comprises the second rolling ball 24 disposed in the second groove 216 and abuts against the cover plate 13.

Specifically, a shape of the second groove 216 matches a shape of the second rolling ball 24. For example, the second rolling ball 24 is spherical and has a small moving resistance. The second groove 216 is a semicircular groove. A diameter of the second rolling ball 24 is equal to a diameter of the second groove 216. In other words, a half of the second rolling ball 24 is disposed in the second groove 216. The second rolling ball 24 is tightly combined with the second groove 216, so that when the second rolling ball 24 moves, the casing 21 of the first lens module 20 is driven to move. A number of the second groove 216 is one or more. For example, the number of the second groove 216 is one, two, three, four, or more. In this embodiment, the number of the second groove 216 is four. A number of the second rolling ball 24 may also be one or more. In this embodiment, the number of the second rolling ball 24 is same as the number of the second groove 216, which is also four. The four second grooves 216 are formed on the top surface of the casing 21 at intervals. The second rolling balls 24 are disposed in the second grooves 216 and abut against the cover plate 13, so that the first lens module 20 is confined between the cover plate 13 and the base plate 11, thereby preventing the first lens module 20 from shaking or tilting in the z direction, and ensuring that the imaging quality is not affected.

Please refer to FIG. 4 and FIG. 10. In some embodiments, the surface of the cover plate 13 facing the top surface 213 is provided with the second slide rail 134. The second rolling ball 24 is disposed in the second groove 216 and abuts against the bottom of the second slide rail 134.

Specifically, the second slide rail 134 may be a groove formed on the surface of the cover plate 13 facing the top surface 213 with an extending direction parallel to the optical axis O. The first sliding rail 112 may also be a boss disposed on the surface of the cover plate 13 facing the top surface 213 with an extending direction parallel to the optical axis O. A surface of the boss facing the top surface 213 of the casing 21 is provided with a groove matching the second rolling ball 24. In this embodiment, the second slide rail 134 is a groove formed on the surface of the cover plate 13 facing the top surface 213 with an extending direction parallel to the optical axis O. After the first lens module 20 is disposed in the receiving space 14, a part of the second rolling ball 24 is disposed in the second slide rail 134 and abuts against the bottom of the second slide rail 134. A cross-section of an inner wall of the second slide rail 134 cut by the plane perpendicular to the optical axis O is a third arc. A cross-section of an outer contour of the second rolling ball 24 cut by the plane perpendicular to the optical axis O is a fourth arc. A curvature of the third arc is same as a curvature of the fourth arc. When the second rolling ball 24 rotates along the second slide rail 134, in the y direction, opposite sides of an outer wall of the second rolling ball 24 are abutted by opposite sides of the inner wall of the second slide rail 134, thereby restricting movement of the second rolling ball 24 in the y direction, and preventing the first lens module 20 from shaking or tilting in the y direction.

A number of the second slide rail 134 may be one or more. The number of the second slide rail 134 is determined according to positions of the four second groove 216. For example, if centers of the four second groove 216 are on a straight line parallel to the optical axis O, only one second slide rail 134 is needed. For another example, the four second groove 216 are divided into two groups. Each group comprises two second groove 216. A line connecting centers of the two second groove 216 in each group is parallel to the optical axis O. The line connecting the centers of the two second groove 216 in one group does not overlap with the line connecting the centers of the two second groove 216 in the other group. Therefore, two second slide rails 134 are required, which respectively correspond to the two groups each comprising the two second groove 216. In this embodiment, the four second groove 216 are divided into the two groups, each group comprises the two second groove 216, and the line connecting the centers of the two second groove 216 in one group is parallel to the line connecting the centers of the two second groove 216 in the other group, and is parallel to the optical axis O. The four second groove 216 may be enclosed in a rectangle. Therefore, when the four second rolling balls 24 slide in the two second slide rails 134, the four second rolling balls 24 are restricted in the two second slide rails 134. And, in the y direction, the opposite sides of the outer wall of each of the second rolling ball 24 are abutted by the opposite sides of the inner wall of one corresponding second slide rail 134, thereby preventing the first lens module 20 from shaking or tilting in the y direction, and further ensuring that the imaging quality of the imaging device 100 is not affected.

Please refer to FIG. 11. In some embodiments, the number of the first lens module 20 may be multiple. The sliding block 212 of each first lens module 20 is slidably disposed in the sliding groove 125. The housing 10 further comprises one or more spacer plates 15 connected to the side plate 12. Two adjacent first lens modules 20 are separated by one spacer plate 15.

Specifically, two adjacent first lens modules 20 are separated by one spacer plate 15. The spacer plates 15 can limit the first lens modules 20. A movement stroke of each of the first lens modules 20 may be determined according to a focal length range of the imaging device 100. And then, installation positions of the spacer plates 15 are determined according to the movement stroke of each of the first lens modules 20, as long as it is satisfied that the spacer plates 15 do not block the light-outlets 2112, and that the spacer plates 15 can accurately limit the first lens modules 20. As shown in FIG. 11, the number of the first lens module 20 is two. One spacer plate 15 is disposed between the two first lens modules 20, so that one of the two first lens modules 20 can only move between the spacer plate 15 and the second lens module 30, and the other first lens module 20 can only move between the spacer plate 15 and the photosensitive element 50.

In the description of the present disclosure, reference terms such as "certain embodiments", "an embodiment", "some embodiments", "exemplary embodiments", "an example", "a specific example", and "some examples" mean that specific features, structures, materials, or characteristics described with reference to the embodiments or examples are included in at least one embodiment or example in the embodiments of the present disclosure. In the present specification, example expressions of the above terms are not necessarily with respect to same embodiments or examples. Furthermore, the described specific features, structures, materials, or characteristics can be combined in a proper way in any one or more of the embodiments or examples.

Moreover, terms "first" and "second" are merely used for descriptive purposes and should not to be construed as indicating or implying a relative importance or implicitly indicating a number of the indicated technical features. Therefore, features defined with "first" and "second" may explicitly or implicitly includes at least one such feature. In the description of the present disclosure, a term "a plurality of" means "two or more" unless otherwise specifically limited.

Although the embodiments of the present disclosure have been illustrated and described above. It can be understood that the above embodiments are exemplary and should not be construed as limiting the present disclosure. Those skilled in the art can change, modify, replace, and transform the above embodiments within the scope of the present disclosure. The scope of the present disclosure is defined by the claims and their equivalents.

What is claimed is:

1. An imaging device, comprising:
    a housing comprising a base plate and a side plate disposed on the base plate, wherein the side plate is provided with a sliding groove; and
    a first lens module comprising a casing and a lens group disposed in the casing, wherein the casing comprises a main body and a sliding block coupled to the main body, an extending direction of the sliding groove being parallel to an optical axis of the lens group, the sliding block being slidably disposed in the sliding groove, and the casing drives the lens group to slide;
    wherein the side plate is further provided with an installation groove, one end of the installation groove penetrates a surface of the side plate away from the base plate, the other end of the installation groove communicates with the sliding groove, and the sliding block is disposed in the sliding groove.

2. The imaging device according to claim 1, wherein in a direction perpendicular to a bearing surface of the base plate, opposite sides of the sliding block respectively abut against opposite sides of an inner wall of the sliding groove.

3. The imaging device according to claim 1, wherein an extending direction of the installation groove is perpendicular or inclined to the extending direction of the sliding groove.

4. The imaging device according to claim 1, wherein the housing further comprises a cover plate disposed on the side plate and comprising a cover plate body and a resisting portion, the resisting portion is disposed on a side of the cover plate body and in the installation groove, and a length of the resisting portion in a direction perpendicular to a bearing surface of the base plate is equal to a depth of the installation groove in the direction perpendicular to the bearing surface.

5. The imaging device according to claim 4, wherein when the resisting portion is disposed in the installation groove, the resisting portion completely fills the installation groove.

6. The imaging device according to claim 4, wherein the casing further comprises a top surface and a bottom surface opposite to each other, the top surface faces the cover plate, the bottom surface faces the base plate and is provided with a first groove, a surface of the base plate facing the bottom surface is provided with a first slide rail, and the first lens module further comprises a first rolling ball disposed in the first groove and abuts against a bottom of the first slide rail.

7. The imaging device according to claim 6, wherein the top surface is provided with a second groove, and the first lens module further comprises a second rolling ball disposed in the second groove and abuts against the cover plate.

8. The imaging device according to claim 6, wherein a surface of the cover plate facing the top surface is provided with a second slide rail, and the second ball is disposed in the second groove and abuts against a bottom of the second slide rail.

9. The imaging device according to claim 1, wherein a number of the first lens module is multiple, the sliding block of each first lens module is slidably disposed in the sliding groove, the housing further comprises one or more spacer plates connected to the side plate, and two adjacent first lens modules are separated by one spacer plate.

10. An electronic device, comprising a chassis and an imaging device disposed on the chassis, wherein the imaging device comprises:
a housing comprising a base plate and a side plate disposed on the base plate, wherein the side plate is provided with a sliding groove; and
a first lens module comprising a casing and a lens group disposed in the casing, wherein the casing comprises a main body and a sliding block coupled to the main body, an extending direction of the sliding groove being parallel to an optical axis of the lens group, the sliding block being slidably disposed in the sliding groove, and the casing drives the lens group to slide;
wherein the side plate is further provided with an installation groove, one end of the installation groove penetrates a surface of the side plate away from the base plate, the other end of the installation groove communicates with the sliding groove, and the sliding block is disposed in the sliding groove.

11. The electronic device according to claim 10, wherein in a direction perpendicular to a bearing surface of the base plate, opposite sides of the sliding block respectively abut against opposite sides of an inner wall of the sliding groove.

12. The electronic device according to claim 10, wherein an extending direction of the installation groove is perpendicular or inclined to the extending direction of the sliding groove.

13. The electronic device according to claim 10, wherein the housing further comprises a cover plate disposed on the side plate and comprising a cover plate body and a resisting portion, the resisting portion is disposed on a side of the cover plate body and in the installation groove, and a length of the resisting portion in a direction perpendicular to a bearing surface of the base plate is equal to a depth of the installation groove in the direction perpendicular to the bearing surface.

14. The electronic device according to claim 13, wherein when the resisting portion is disposed in the installation groove, the resisting portion completely fills the installation groove.

15. The electronic device according to claim 13, wherein the casing further comprises a top surface and a bottom surface opposite to each other, the top surface faces the cover plate, the bottom surface faces the base plate and is provided with a first groove, a surface of the base plate facing the bottom surface is provided with a first slide rail, and the first lens module further comprises a first rolling ball disposed in the first groove and abuts against a bottom of the first slide rail.

16. The electronic device according to claim 15, wherein the top surface is provided with a second groove, and the first lens module further comprises a second rolling ball disposed in the second groove and abuts against the cover plate.

17. The electronic device according to claim 15, wherein a surface of the cover plate facing the top surface is provided with a second slide rail, and the second ball is disposed in the second groove and abuts against a bottom of the second slide rail.

18. The electronic device according to claim 10, wherein a number of the first lens module is multiple, the sliding block of each first lens module is slidably disposed in the sliding groove, the housing further comprises one or more spacer plates connected to the side plate, and two adjacent first lens modules are separated by one spacer plate.

* * * * *